(12) United States Patent
Yoon et al.

(10) Patent No.: US 7,833,655 B2
(45) Date of Patent: Nov. 16, 2010

(54) FRAME MEMBER FOR FABRICATION OF BATTERY MODULE

(75) Inventors: Junill Yoon, Seoul (KR); Heekook Yang, Daejeon (KR); Juyoung Kim, Daejeon (KR); Juhyun Kang, Daejeon (KR); Jongmoon Yoon, Daejeon (KR); Seungjae You, Daejeon (KR); John E. Namgoong, Daejeon (KR)

(73) Assignee: LG Chem, Ltd. (KR)

( * ) Notice: Subject to any disclaimer, the term of this patent is extended or adjusted under 35 U.S.C. 154(b) by 984 days.

(21) Appl. No.: 11/561,198

(22) Filed: Nov. 17, 2006

(65) Prior Publication Data
US 2007/0264563 A1   Nov. 15, 2007

(30) Foreign Application Priority Data
Feb. 9, 2006 (KR) ............... 10-2006-0012306

(51) Int. Cl.
*H01M 6/42* (2006.01)
*H01M 2/02* (2006.01)

(52) U.S. Cl. .................. 429/149; 429/179
(58) Field of Classification Search .......... 429/149, 429/179, 152, 159, 180, 181
See application file for complete search history.

(56) References Cited

U.S. PATENT DOCUMENTS

2003/0215702 A1* 11/2003 Tanjou et al. ............ 429/127
2005/0031946 A1*  2/2005 Kruger et al. ............ 429/159
2006/0234119 A1* 10/2006 Kruger et al. ............ 429/160

FOREIGN PATENT DOCUMENTS

KR  10-2006-0047061  5/2006
WO     2005/074054   8/2005

* cited by examiner

*Primary Examiner*—Dah-Wei D Yuan
*Assistant Examiner*—Stephan Essex
(74) *Attorney, Agent, or Firm*—Cantor Colburn LLP

(57) ABSTRACT

Disclosed herein is a frame member for fabrication of a battery module including two battery cells, each of which has electrode terminals formed at upper and lower ends thereof, as unit cells. The frame member includes a lower-end frame having a groove, into which lower electrode terminals of the unit cells are inserted while the lower electrode terminals of the unit cells are coupled with each other, the lower-end frame being constructed such that lower-end sealing parts of the unit cells are mounted to the lower-end frame, an upper-end frame constructed such that upper-end sealing parts of the unit cells are mounted to the upper-end frame, and external input and output terminals, which are connected to upper electrode terminals of the unit cells, protrude from the outer surface of the upper-end frame, and a side frame connected between the lower-end frame and the upper-end frame, the side frame being constructed such that one-side sealing parts of the unit cells are mounted to the side frame. The frame member according to the present invention is effective in that a battery module is fabricated while the battery module has high mechanical strength, and the size and the weight of the battery module are minimized. Furthermore, it is possible to easily mount the detecting means that detects the operation of the battery cells. Consequently, the battery module is easily fabricated, and the occurrence of short circuits is effectively prevented during the assembly or the operation of the battery module.

9 Claims, 5 Drawing Sheets

600

FRAME MEMBER FOR FABRICATION OF BATTERY MODULE

FIELD OF THE INVENTION

The present invention relates to a frame member for fabrication of a battery module, and, more particularly, to a frame member for fabrication of a battery module including two battery cells, each of which has electrode terminals formed at upper and lower ends thereof, as unit cells, wherein the frame member comprises: a lower-end frame having a groove, into which lower electrode terminals of the unit cells are inserted while the lower electrode terminals of the unit cells are coupled with each other, the lower-end frame being constructed such that lower-end sealing parts of the unit cells are mounted to the lower-end frame; an upper-end frame constructed such that upper-end sealing parts of the unit cells are mounted to the upper-end frame, and external input and output terminals, which are connected to upper electrode terminals of the unit cells, protrude from the outer surface of the upper-end frame; and a side frame connected between the lower-end frame and the upper-end frame, the side frame being constructed such that one-side sealing parts of the unit cells are mounted to the side frame.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several small-sized cells for each device. On the other hand, medium- or large-sized devices, such as vehicles, use a medium- or large-sized battery module having a plurality of battery cells electrically connected with each other because high output and large capacity are necessary for the medium- or large-sized devices.

Preferably, the medium- or large-sized battery module is manufactured with small size and small weight if possible. For this reason, a prismatic battery or a pouch-shaped battery, which can be stacked with high integration and has a small weight to capacity ratio, is usually used as a battery cell of the medium- or large-sized battery module. Especially, much interest is currently generated in the pouch-shaped battery, which uses an aluminum laminate sheet as a sheathing member, because the pouch-shaped battery is lightweight and can be manufactured with low costs.

FIG. 1 is a perspective view typically illustrating a conventional representative pouch-shaped battery. The pouch-shaped battery 10 shown in FIG. 1 is constructed in a structure in which two electrode leads 11 and 12 protrude from the upper end and the lower end of a battery body 13, respectively, while the electrode leads 11 and 12 are opposite to each other. A sheathing member 14 comprises upper and lower sheathing parts. That is, the sheathing member 14 is a two-unit member. An electrode assembly (not shown) is received in a receiving part, which is defined between the upper and lower sheathing parts of the sheathing member 14. Opposite sides 14a and upper and lower ends 14b and 14c, which are contact regions of the upper and lower sheathing parts of the sheathing member 14, are bonded to each other, whereby the pouch-shaped battery 10 is manufactured. The sheathing member 14 is constructed in a laminate structure of a resin layer/a metal film layer/a resin layer. Consequently, it is possible to bond the opposite sides 14a and upper and lower ends 14b and 14c of the upper and lower sheathing parts of the sheathing member 14, which are in contact with each other, to each other by applying heat and pressure to the opposite sides 14a and upper and lower ends 14b and 14c of the upper and lower sheathing parts of the sheathing member 14 so as to weld the resin layers to each other. According to circumstances, the opposite sides 14a and upper and lower ends 14b and 14c of the upper and lower sheathing parts of the sheathing member 14 may be bonded to each other using a bonding agent. For the opposite sides 14a of the sheathing member 14, the same resin layers of the upper and lower sheathing parts of the sheathing member 14 are in direct contact with each other, whereby uniform sealing at the opposite sides 14a of the sheathing member 14 is accomplished by welding. For the upper and lower ends 14b and 14c of the sheathing member 14, on the other hand, the electrode leads 11 and 12 protrude from the upper and lower ends 14b and 14c of the sheathing member 14. For this reason, the upper and lower ends 14b and 14c of the upper and lower sheathing parts of the sheathing member 14 are thermally welded to each other, while a film-shaped sealing member 16 is interposed between the electrode leads 11 and 12 and the sheathing member 14, in consideration of the thickness of the electrode leads 11 and 12 and the difference in material between the electrode leads 11 and 12 and the sheathing member 14, so as to increase sealability.

However, the mechanical strength of the sheathing member 14 is low. In order to solve this problem, there has been proposed a method of mounting battery cells (unit cells) in a pack case, such as a cartridge, so as to manufacture a battery module having a stable structure. Also, a device or a vehicle, in which a medium- or large-sized battery module is installed, has a limited installation space. Consequently, when the size of the battery module is increased due to the use of the pack case, such as the cartridge, the spatial utilization is lowered. Due to the above-mentioned low mechanical strength, the battery cells repeatedly expand and contract during the charge and the discharge of the battery cells. As a result, the thermally welded regions may be easily separated from each other.

Since the battery module is a structure including a plurality of unit cells, which are combined, the safety and the operating efficiency of the battery module are lowered when overvoltage, overcurrent, and overheat occurs in some of the unit cells. Consequently, means for detecting the overvoltage, the overcurrent, and the overheat are needed. Specifically, voltage and temperature sensors are connected to the battery cells so as to detect and control the operation of the battery cells in real time or at predetermined time intervals. However, the attachment or the connection of the detecting means complicates the assembly process of the battery module. In addition, short circuits may occur due to the provision of a plurality of wires.

SUMMARY OF THE INVENTION

Therefore, the present invention has been made to solve the above problems, and other technical problems that have yet to be resolved.

Specifically, it is an object of the present invention to provide a frame member for fabrication of a battery module, which is capable of enabling the battery module to be effectively fabricated, while the size and the weight of the battery module are minimized, when the battery module is fabricated using a battery cell having a structure in which an electrode assembly is mounted in a battery case made of a laminate sheet including a metal layer and a resin layer.

It is another object of the present invention to provide a frame member for fabrication of a battery module, which has detecting means that detects the operation of a battery cell, whereby the fabrication of the battery module is easily accomplished, and the occurrence of short circuits is effectively prevented during the assembly or the operation of the battery module.

It is another object of the present invention to provide a frame member for fabrication of a battery module, which is capable of effectively increasing the mechanical strength of a battery cell.

It is yet another object of the present invention to provide a method of fabricating a battery module using the above-described frame member.

In accordance with one aspect of the present invention, the above and other objects can be accomplished by the provision of a frame member for fabrication of a battery module including two battery cells, each of which has electrode terminals formed at upper and lower ends thereof, as unit cells, wherein the frame member comprises: a lower-end frame having a groove, into which lower electrode terminals of the unit cells are inserted while the lower electrode terminals of the unit cells are coupled with each other, the lower-end frame being constructed such that lower-end sealing parts of the unit cells are mounted to the lower-end frame; an upper-end frame constructed such that upper-end sealing parts of the unit cells are mounted to the upper-end frame, and external input and output terminals, which are connected to upper electrode terminals of the unit cells, protrude from the outer surface of the upper-end frame; and a side frame connected between the lower-end frame and the upper-end frame, the side frame being constructed such that one-side sealing parts of the unit cells are mounted to the side frame.

Each battery cell is a secondary battery having an electrode assembly, which can be charged and discharged, mounted therein and a sealing part formed at the edge thereof by thermal welding. Preferably, the secondary battery is constructed in a structure in which the electrode assembly is mounted in a battery case made of a laminate sheet including a metal layer and a resin layer, for example, a pouch-shaped case made of an aluminum laminate sheet. Hereinafter, the secondary battery with the above-stated construction will be referred to as a pouch-shaped battery cell.

The case of the pouch-shaped battery may be constructed in various structures. For example, the sheathing member of the pouch-shaped battery may be constructed in a structure in which the electrode assembly is received in a receiving part formed at the upper inner surface and/or the lower inner surface of a two-unit member, and the upper and lower contact regions are sealed. A pouch-shaped battery cell with the above-described construction is disclosed in PCT International Application No. PCT/KR2004/003312, which has been filed in the name of the applicant of the present patent application. The disclosure of the above-mentioned patent application is hereby incorporated by reference as if fully set forth herein.

The electrode assembly comprises cathodes and anodes, by which the charge and the discharge of the battery are possible. The electrode assembly is constructed in a structure in which the cathodes and the anodes are stacked while separators are disposed between the respective cathodes and the respective anodes. For example, the electrode assembly is constructed in a jelly-roll type structure or in a stacking type structure. The cathodes and the anodes of the electrode assembly may be constructed such that electrode taps of the cathodes and electrode taps of the anodes directly protrude outward from the battery. Alternatively, the cathodes and the anodes of the electrode assembly may be constructed such that the electrode taps of the cathodes and the electrode taps of the anodes are connected to additional leads, and the leads protrude outward from the battery. The electrode taps or electrode terminals of the electrode leads are constructed, for example, such that a cathode terminal protrudes from one side of the battery cell, and an anode terminal protrudes from the other side of the battery cell.

According to the present invention, the frame member is constructed in a structure in which the upper-end frame and the lower-end frame are connected to each other via the side frame. That is, the frame member is constructed generally in a "⊏"-shaped structure.

In a preferred embodiment, the upper-end frame or the lower-end frame may be provided with a terminal (detection terminal) for detecting the voltage and/or the temperature of the unit cells, and the upper-end frame may be provided at the external input and output terminal side thereof with connection terminals for connecting the detection terminal to an external circuit. Consequently, when the unit cells are mounted to the frame member, the unit cells are automatically connected to the detecting means for detecting the voltage and/or the temperature of the battery cells, and therefore, a process for fabricating the battery module is further simplified.

In a structure in which the detection terminal is mounted at the lower-end frame, and the detection terminal is connected to the connection terminals of the upper-end frame via a circuit mounted in the side frame, a wire for connecting the detection terminal is not exposed to the outside. Consequently, the occurrence of short circuits is prevented during the assembly and the use of the battery module.

In the frame member according to the present invention, the lower-end frame is a region where the lower-end sealing parts of the two unit cells are mounted. The lower electrode terminals of the unit cells are inserted into the groove of the lower-end frame while the lower electrode terminals of the unit cells are coupled with each other. The lower electrode terminals of the unit cells may be inserted into the groove of the lower-end frame while the lower electrode terminals of the unit cells are coupled with each other, for example, by welding. The groove of the lower-end frame may have a size corresponding to that of the coupled electrode terminals. Alternatively, the lower-end frame may be constructed in a structure in which the lower-end frame is open at the side opposite to the side frame.

In the case that the voltage and/or temperature detection terminal is located at the lower-end frame, it is preferable that the lower-end frame have a through-hole, to which the detection terminal is connected. Consequently, the electrode terminals may be connected to the detection terminal through the through-hole while the coupled electrode terminals are inserted in the groove. Alternatively, corresponding regions of the electrode terminals are drilled through the through-hole while the coupled electrode terminals are inserted in the groove, and an additional conductive fixing member may be inserted through the through-hole such that the electrode terminals can be connected to the detection terminal.

The side frame serves to interconnect the lower-end frame and the upper-end frame. The side frame is a region where the one-side sealing parts of the unit cells are mounted. Consequently, when the unit cells are mounted to the frame member, the other-side sealing parts of the unit cells are exposed while the other-side sealing parts are not supported by the side frame.

Preferably, the side frame may be provided with grooves, into which the one-side sealing parts of the unit cells are inserted, whereby the one-side sealing parts of the unit cells can be easily mounted to the side frame.

The external input and output terminals, which are connected to the upper electrode terminals of the unit cells, protrude from the outer surface of the upper-end frame where the upper-end sealing parts of the unit cells are mounted.

Since the lower electrode terminals of the unit cells are coupled to each other, the upper electrode terminals of the unit cells are mounted to the upper-end frame while upper electrode terminals of the unit cells are electrically isolated from each other. In a preferred embodiment, the upper-end frame is provided with grooves (insertion grooves), into which the upper-end sealing parts of the unit cells are inserted. Consequently, it is possible to bend the electrode terminals of the unit cells in opposite directions and then mount the bent electrode terminals of the unit cells to the upper-end frame while the upper-end sealing parts of the unit cells are inserted into the insertion grooves. In this case, the isolation of the two electrode terminals from each other is stably accomplished while the electrode terminals are mounted to the upper-end frame.

The frame member according to the present invention is not particularly restricted so long as the frame member is made of an electrically insulating material. Preferably, the frame member is made of a plastic resin. More preferably, the upper-end frame, the lower-end frame, and the side frame are integrally formed.

In accordance with another aspect of the present invention, there is provided a method of mounting two unit cells to the frame member. According to the present invention, two examples may be provided although various mounting methods are possible.

According to a first example, the method comprises the steps of: coupling lower electrode terminals of the unit cells with each other; bending the lower electrode terminals of the unit cells such that the lower electrode terminals face each other; and mounting the unit cells to the frame member through the open side thereof such that the coupled lower electrode terminals of the unit cells are inserted into the groove of the lower-end frame.

According to a second example, the method comprises the steps of: coupling lower electrode terminals of the unit cells with each other; inserting the coupled lower electrode terminals of the unit cells into the groove of the lower-end frame and fixing the coupled lower electrode terminals of the unit cells to the lower-end frame; and bending the coupled lower electrode terminals of the unit cells such that the lower electrode terminals face each other.

In the second example, the step of fixing the coupled lower electrode terminals of the unit cells to the lower-end frame is more stably performed, for example, by drilling the coupled lower electrode terminals of the unit cells through the through-hole of the lower-end frame and inserting a fixing member through the through-hole.

It should be noted, however, that other various methods may be possible in addition to the above-mentioned examples, and, it should be interpreted that such methods are included in the scope of the present invention.

In accordance with yet another aspect of the present invention, there is provided a medium- or large-sized high-output, large-capacity battery module including a plurality of unit modules, each of which is fabricated using the above-described frame member.

Two unit cells are mounted to the frame member according to the present invention. Consequently, when a plurality of unit modules, each of which is fabricated as described above, are combined with each other, the medium- or large-sized high-output, large-capacity battery module is manufactured. The combination of the unit modules may be changed depending upon desired output and capacity, and therefore, the applicability of the unit modules is very high.

The medium- or large-sized battery module according to the present invention is particularly preferable as a power source for devices, such as electric vehicles, hybrid electric vehicles, and electric motorcycles, which require high-output and large-capacity electric power and to which various external forces, for example, vibration and impact, are applied.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
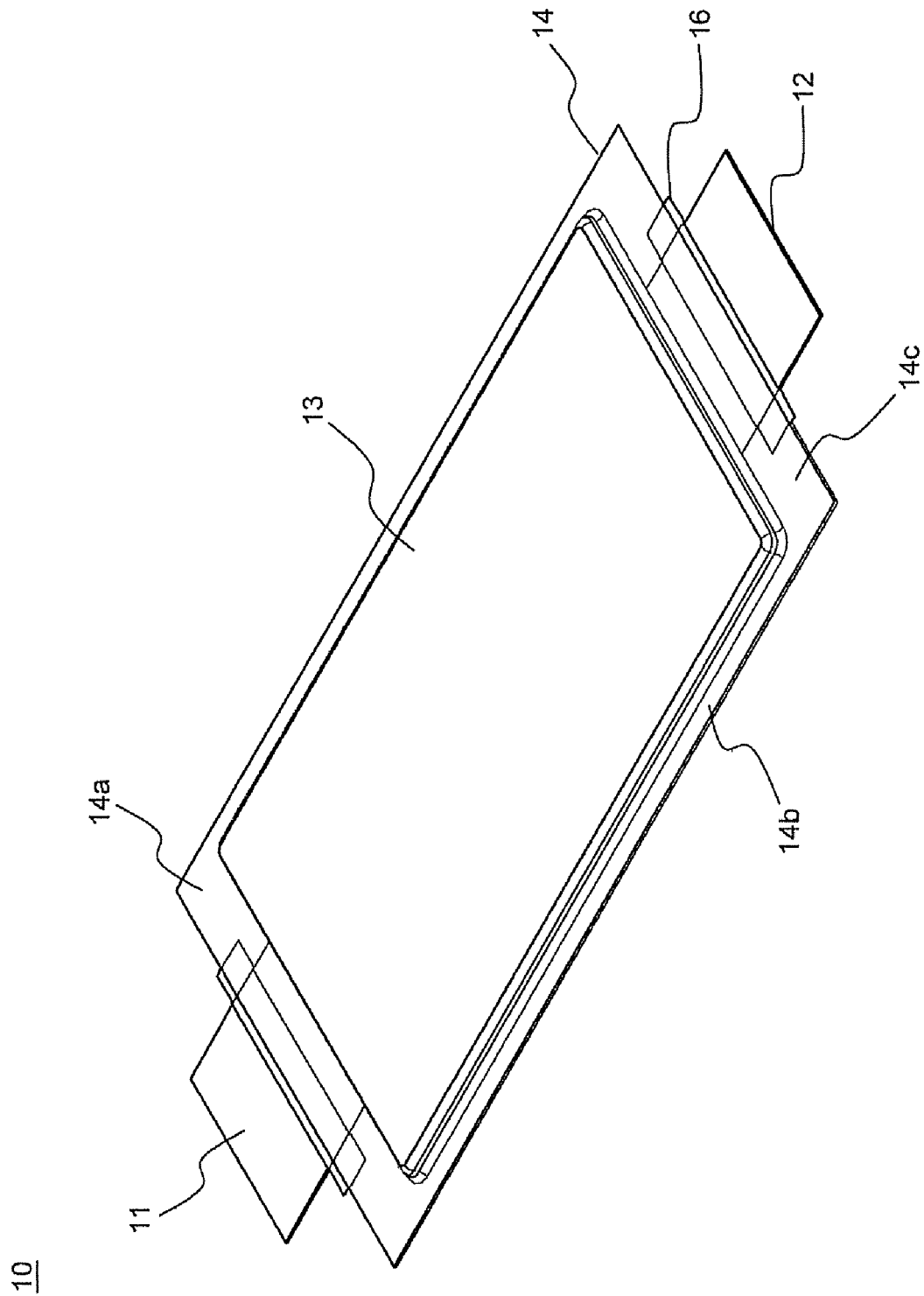
FIG. 1 is a perspective view illustrating a conventional representative pouch-shaped battery.
Figure 2:
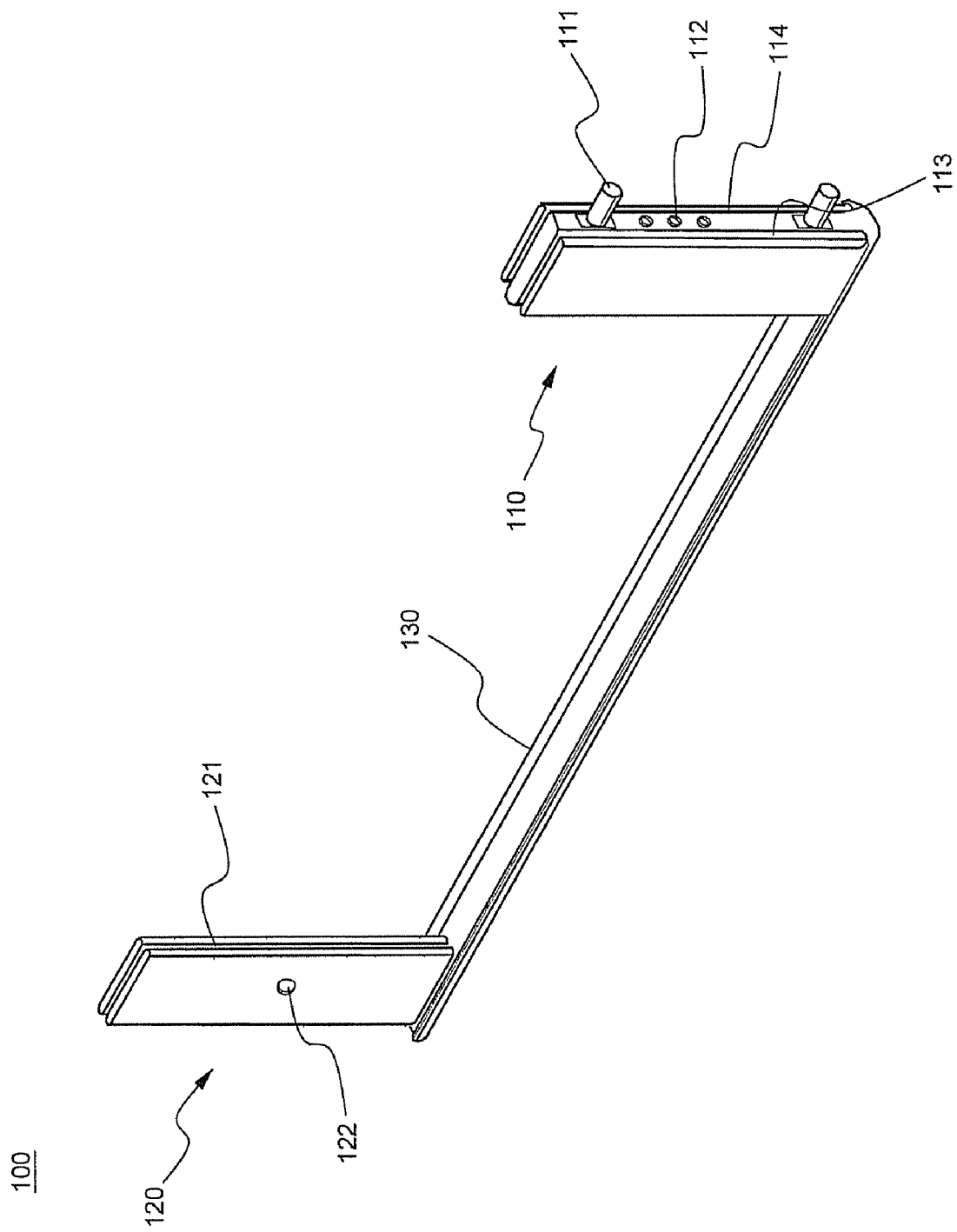
FIG. 2 is a perspective view illustrating a frame member for fabrication of a battery module according to a preferred embodiment of the present invention.

FIG. 2 is a perspective view illustrating a frame member for fabrication of a battery module according to a preferred embodiment of the present invention.

Referring to FIG. 2, the frame member 100 includes an upper-end frame 110, a lower-end frame 120, and a side frame 130. One side of the upper-end frame 110 is connected to one side of the lower-end frame 120 via the side frame 130. In other words, the frame member 100 is constructed in a "⊏"-shaped structure in which one side of the frame member 100 is open.

At the upper-end surface of the upper-end frame 110 are formed external input and output terminals 111 and voltage and temperature connection terminals 112. In the upper-end frame 110 are formed a pair of insertion grooves 113 and 114, into which upper-end sealing parts of unit cells (not shown) are inserted, such that the insertion grooves 113 and 114 are opened in one side of upper-end frame 110.

In the lower-end frame 120 is formed a groove 121, into which lower electrode terminals of the unit cells are inserted, such that the groove 121 is opened in the same direction as the insertion grooves 113 and 114. In the lower-end frame 120 is formed a through-hole 122, which corresponds to the electrode terminals of the unit cells. The through-hole 122 is connected to a voltage and temperature detection terminal (not shown).

In the side frame 130 is mounted a circuit (not shown) for connecting the detection terminal of the lower-end frame 120 to the connection terminal 112 of the upper-end frame 110.

Figure 3:
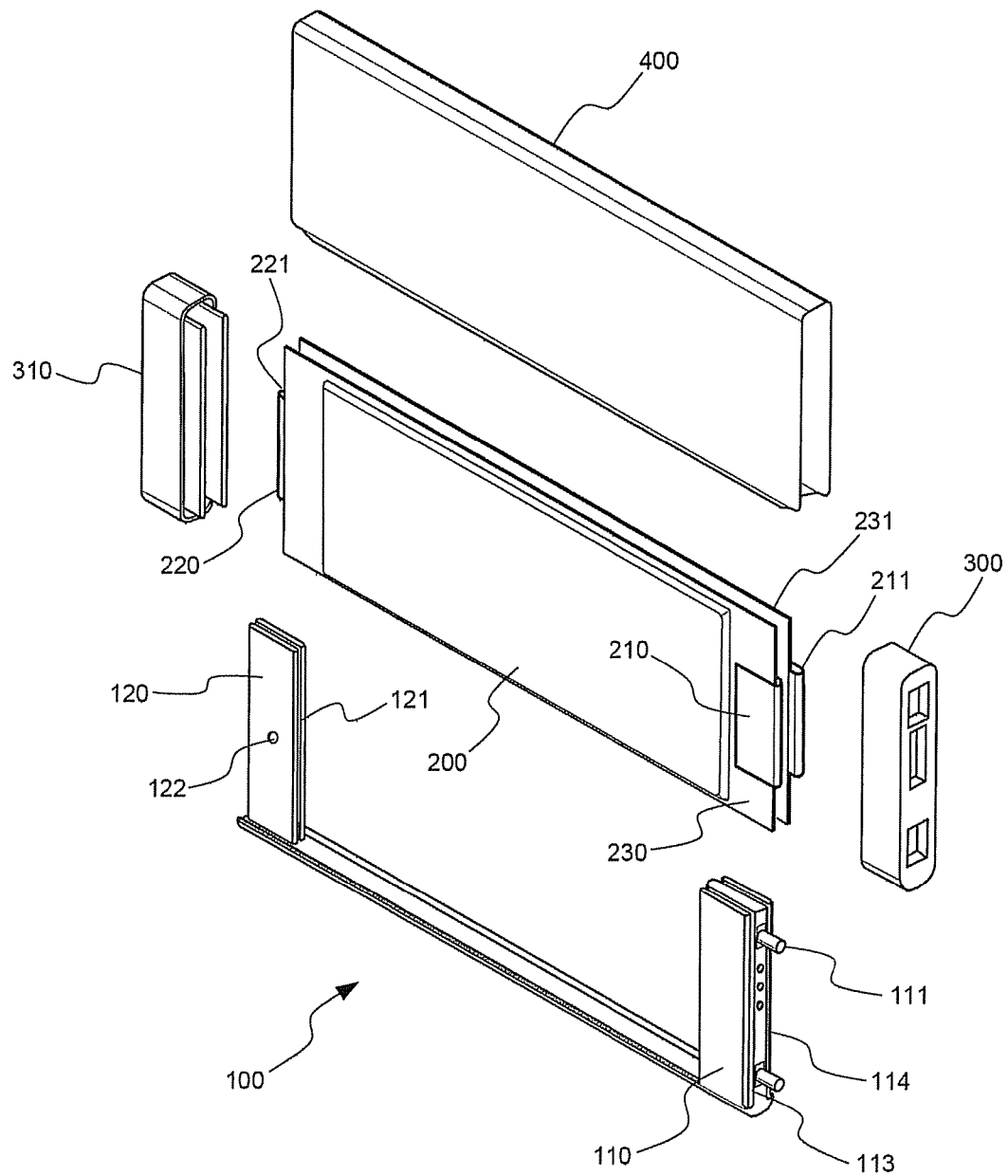
FIG. 3 is an exploded perspective view illustrating a unit module fabricated using the frame member shown in FIG. 2.

FIG. 3 is an exploded perspective view illustrating a unit module fabricated using the frame member shown in FIG. 2

Referring to FIG. 3, the battery module 500 includes a frame member 100, a pair of unit cells (battery cells) 200 and 201, an upper-end cap 300, a lower-end cap 310, and a cover 400. The battery cells 200 and 201 are mounted to the frame member 100 in a structure in which the battery cells 200 and 201 are coupled to each other while upper electrode terminals 210 and 211 of the battery cells 200 and 201 are bent in opposite directions, and lower electrode terminals 220 and 221 of the battery cells 200 and 201 are bent toward each other.

For example, the lower electrode terminals 220 and 221 of the battery cells 200 and 201 may be coupled to each other by welding, and then the coupled lower electrode terminals 220 and 221 of the battery cells 200 and 201 may be inserted into the groove 121 of the lower-end frame 120. When the lower electrode terminals 220 and 221 of the battery cells 200 and 201 are mounted to the lower-end frame 120, the coupled lower electrode terminals 220 and 221 of the battery cells 200 and 201 may be inserted into the groove 121 through the lower end thereof, and then the lower electrode terminals 220 and 221 of the battery cells 200 and 201 may be bent toward each other. Alternatively, the coupled lower electrode terminals 220 and 221 of the battery cells 200 and 201 may be bent toward each other, and then the bent lower electrode terminals 220 and 221 of the battery cells 200 and 201 may be inserted into the groove 121 through the open side thereof.

In connection with the former mounting fashion, corresponding regions of the electrode terminals 220 and 221 are drilled through the through-hole 122 while the coupled electrode terminals 220 and 221 are inserted in the groove 121, and an additional conductive fixing member (not shown) may be inserted through the through-hole 122 such that the electrode terminals 220 and 221 can be more securely fixed to each other.

Figure 4:
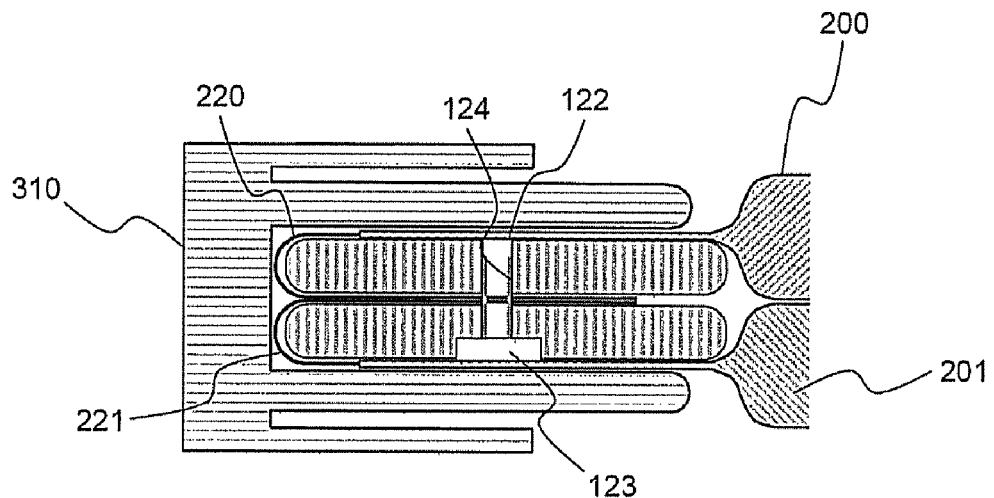
FIG. 4 is a sectional view illustrating the lower-end frame side of the unit module when the unit module shown in FIG. 3 is assembled.

FIG. 4 is a sectional view illustrating the lower-end frame side of the unit module when the unit module shown in FIG. 3 is assembled.

Referring to FIG. 4, the lower electrode terminals 220 and 221 of the battery cells 20Q and 201 are coupled with each other while lower electrode terminals 220 and 221 face each other, and the lower electrode terminals 220 and 221 are connected to a voltage and temperature detection terminal 124, which is attached to the inner surface of the through-hole 222 of the lower-end frame 120, by a fixing member 123 engaged in the through-hole 122. These coupling and connection regions are sealed by the lower-end cap 310, and therefore, the coupling and connection regions are isolated from the outside.

Referring back to FIG. 3, while the lower electrode terminals 220 and 221 of the battery cells 200 and 201 are mounted to the lower-end frame 120 as described above, the upper-end sealing parts 230 and 231 of the battery cells 200 and 201 are inserted into the insertion holes 113 and 114 of the upper-end frame 110, respectively, and the upper electrode terminals 210 and 211 of the battery cells 200 and 201 are bent in opposite directions. The upper electrode terminals 210 and 211 of the battery cells 200 and 201 are brought into tight contact with the upper frame 110 with the result that the upper electrode terminals 210 and 211 are connected to the external input and output terminals 111.

After the pair of battery cells 200 and 201 are mounted to the frame member 100, the cover 400, the upper and lower ends of which are open, is fitted on the battery cells 200 and 201, and the upper-end cap 300 and the lower-end cap 310 are coupled to the battery cells 200 and 201, whereby the unit module 500 is fabricated.

The battery cells 200 and 201 are stably mounted in the cover 400. Preferably, the cover may be made of a high-strength lightweight material, such as aluminum.

Figure 5:
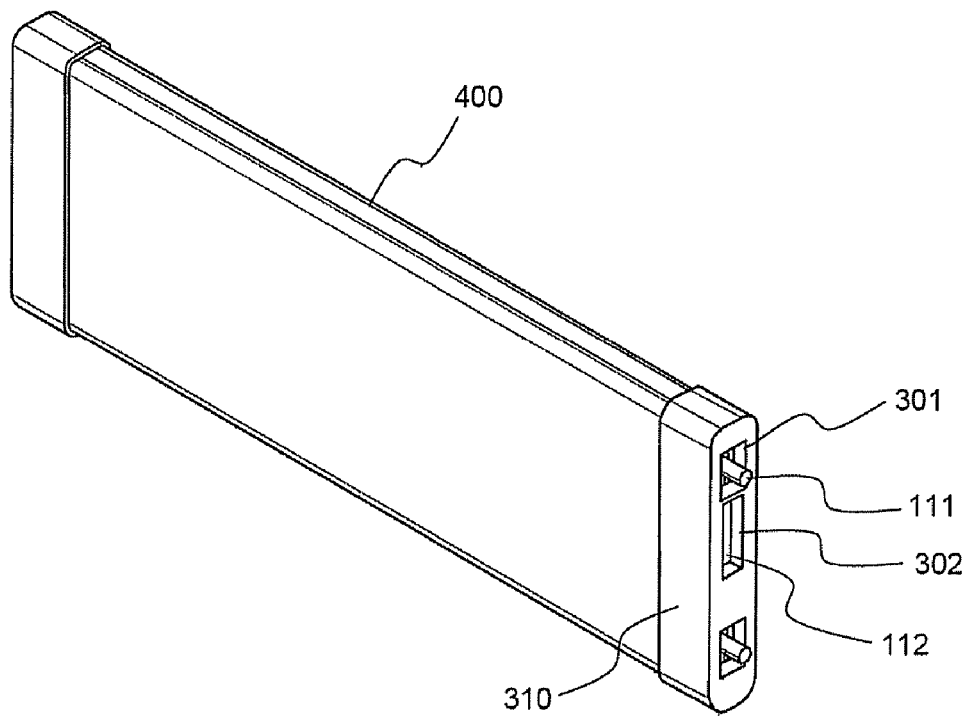
FIG. 5 is a perspective view illustrating a unit module fabricated in the assembly structure of FIG. 4.

FIG. 5 is a perspective view illustrating a unit module fabricated in the assembly structure of FIG. 4.

As shown in FIG. 5, the external input and output terminals 111 and the voltage and temperature detection connecting terminals 112 of the frame member (not shown) are exposed to the outside through openings 301 and 302 of the upper-end cap 300. The two battery cells (not shown) are stably covered by the cover 400. Consequently, the mechanical strength of a unit module 500 having the above-described construction is excellent although the unit module 500 is constructed in a slim structure. Also, the unit module 500 may be fabricated through the simple assembly process as shown in FIG. 4.

Figure 6:
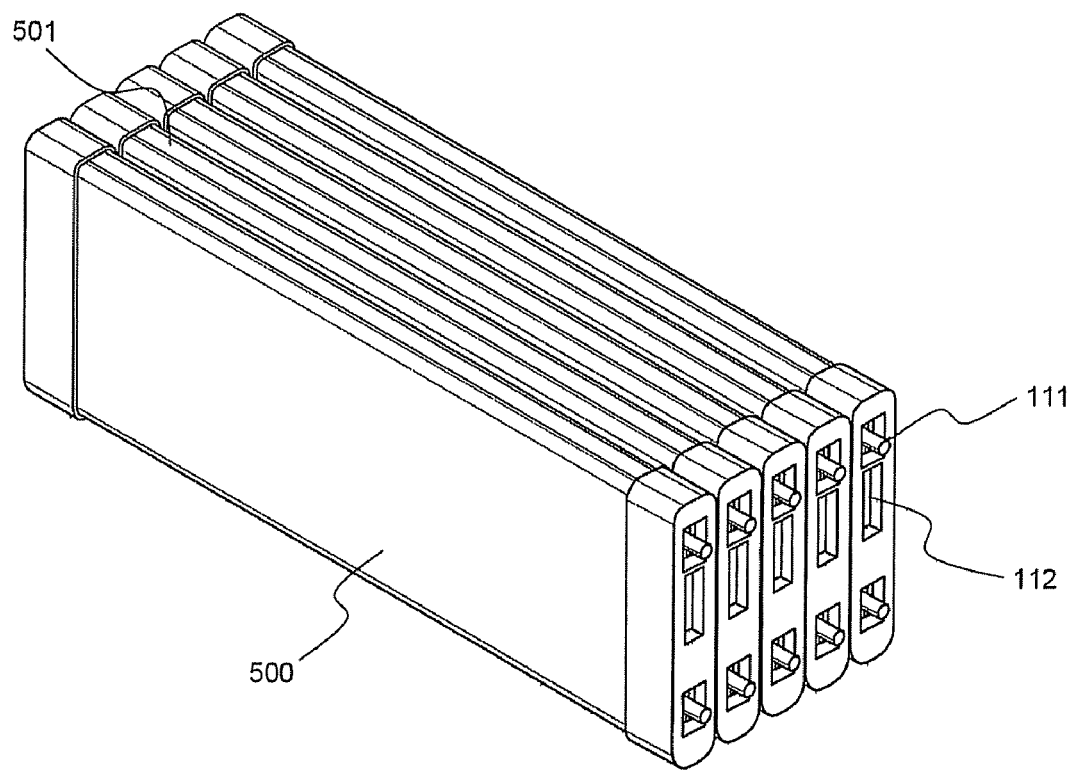
FIG. 6 is a perspective view illustrating a medium- or large-sized battery module fabricated using the battery module of FIG. 5.

FIG. 6 is a perspective view illustrating a medium- or large-sized battery module fabricated using the battery module of FIG. 5.

As shown in FIG. 6, the medium- or large-sized battery module 600 can be very easily manufactured by stacking unit modules 500, 501 . . . according to desired output and capacity. For example, the external input and output terminals 111 and the voltage and temperature detection connecting terminals 112 are connected to the corresponding ones by bus bars (not shown) while the battery modules 500, 501 . . . are stacked as shown in the drawing, whereby the battery module 600 is completed.

The stacking of the battery modules 500, 501 . . . may be accomplished in various forms. For example, the battery modules 500, 501 . . . may be arranged in an alternating orientation structure, which is opposite to the stacking structure shown in FIG. 6. The alternating orientation structure is disclosed in Korean Patent Application No. 2004-0092887, which has been filed in the name of the applicant of the present patent application. The disclosure of the above-mentioned patent application is hereby incorporated by reference as if fully set forth herein.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the frame member according to the present invention is effective in that a battery module is fabricated while the battery module has high mechanical strength, and the size and the weight of the battery module are minimized. Furthermore, it is possible to easily mount the detecting means that detects the operation of the battery cells. Consequently, the battery module is easily fabricated, and the occurrence of short circuits is effectively prevented during the assembly or the operation of the battery module.

What is claimed is:

1. A frame member for fabrication of a battery module including two unit cells which comprise
   - upper electrode terminals and lower electrode terminals disposed at upper ends and opposite lower ends thereof, respectively,
   - upper-end sealing, parts disposed in upper portions of the unit cells, lower-end sealing parts disposed in lower portions of the unit cells, and one-side sealing parts disposed in one-side portions of the unit cells, wherein the frame member comprises:
   - a lower-end frame having a groove, wherein the lower electrode terminals of the unit cells are coupled with each other in the groove, and wherein an entire portion of the lower-end sealing parts of the unit cells is mounted to the lower-end frame;
   - an upper-end frame, wherein an entire portion of the upper-end sealing parts of the unit cells is mounted to the upper-end frame;
   - external input and output terminals, which are electrically connected to the upper electrode terminals of the unit cells and protrude from an outer surface of the upper-end frame; and
   - a side frame connected between the lower-end frame and the upper-end frame, wherein an entire portion of the one-side sealing parts of the unit cells is mounted to the side frame.

2. The frame member according to claim 1, wherein each unit cell is a secondary battery having an electrode assembly mounted in a battery case, the battery case comprising a laminate sheet which includes a metal layer and a resin layer.

3. The frame member according to claim 1, wherein
   the upper-end frame or the lower-end frame further comprise a detection terminal, which detects the voltage and/or the temperature of the unit cells, and
   the upper-end frame comprises connection terminals, which connect the detection terminal to an external circuit, the connection terminals disposed on a same side as the external input and output terminals.

4. The frame member according to claim 3, wherein the detection terminal is mounted at the lower-end frame, and the detection terminal is electrically connected to the connection terminals of the upper-end frame via a circuit mounted in the side frame.

5. The frame member according to claim 4, wherein the lower-end frame has a through-hole, to which the detection terminal is electrically connected.

6. The frame member according to claim 1, wherein the side frame comprises a plurality of grooves in which the one-side sealing parts of the unit cells are disposed.

7. The frame member according to claim 1, wherein the upper-end frame comprises a plurality of insertion grooves in which the upper electrode terminals of the unit cells are disposed, and the upper electrode terminals are bent.

8. A battery module manufactured using the frame member according to claim 1.

9. A frame member comprising:
   - a lower-end frame having a groove, in which a first lower electrode terminal of a first unit cell and a second lower electrode terminal of a second unit cell are coupled, in which a surface of the first lower electrode terminal directly contacts an opposite surface of the second lower electrode terminal, and in which an entire portion of a lower-end sealing part of each of the first and the second unit cells is mounted to the lower-end frame;
   - an upper-end frame having
      - a first insertion groove, in which a first upper electrode terminal and an entire portion of a first upper-end sealing part of the first unit cell are mounted to the upper end frame, and
      - a second insertion groove, in which a second upper end terminal and an entire portion of a second upper-end sealing part of the second unit cell are mounted to the upper-end frame;
   - external input and output terminals, which protrude from an outer surface of the upper-end frame, and which are electrically connected to upper electrode terminals of the first and the second unit cells, respectively; and
   - a side frame, which connects the lower-end frame and the upper-end frame.

* * * * *